United States Patent

[11] 3,561,339

[72] Inventor  Irving Erlichman
              Wayland, Mass.
[21] Appl. No. 785,089
[22] Filed     Dec. 19, 1968
[45] Patented  Feb. 9, 1971
[73] Assignee  Polaroid Corporation
              Cambridge, Mass.
              a corporation of Delaware

[54] PHOTOGRAPHIC APPARATUS
     18 Claims, 5 Drawing Figs.
[52] U.S. Cl. .................................................. 95/13,
                                                           95/19
[51] Int. Cl. .................................................. G03b 17/50
[50] Field of Search .......................................... 95/13, 19,
                        31 (ELEC), 53 (ELEC), (Inquired)

[56]            References Cited
            UNITED STATES PATENTS
     3,152,529  10/1964  Erlichman .................... 95/13

Primary Examiner—John M. Horan
Assistant Examiner—Richard L. Moses
Attorneys—Brown and Mikulka and Robert E. Corb ABSTRACT: An electrically operated camera for exposing and processing a succession of photographic film units arranged in a stack within the container of a film pack including a battery located behind the stack of film units. The camera includes biasing means for urging the forwardmost film unit into position for exposure and for urging electrical contacts into engagement with terminals on the rear of the battery.

FIG. I

INVENTOR.
IRVING ERLICHMAN

PATENTED FEB 9 1971

INVENTOR.
IRVING ERLICHMAN

BY
Brown and Mikulka
and
Leonard S. Selma
ATTORNEYS

PHOTOGRAPHIC APPARATUS

The present invention is concerned with photographic apparatus, such as a self-developing camera, incorporating electrically energized means including, for example, an electrically operated exposure device such as a shutter or flash apparatus, or electrically operated means for processing the film units. The preferred form of camera is adapted to employ a film pack comprising a container and a plurality of film units arranged in a stack within the container. The container preferably includes a forward wall having a light transmitting section, e.g., aperture, through the film units are exposed, and an opening at the rear provided with a closure displaceable with respect to the forward wall. The camera includes means adapted to extend into the container through the opening at the rear thereof for supporting the forwardmost film unit against the forward wall in proper position for exposure.

It has been proposed to incorporate an electric energy source such as a battery within each film container to be discardable therewith following exposure and processing of the film units. A primary advantage of such an arrangement is the assurance that as long as a supply of film units is available for use in the camera, there is also available an energy source for operating the camera to expose and/or process the film units. This avoids the not uncommon experience with electrically energized cameras wherein the battery, usually contained within the camera, fails and the camera is no longer operational even though film for use in the camera may be available. The battery according to the present invention is located within the container holding the film units, preferably behind the stack of film units.

It has also been customary to provide within the container for the film units, means for biasing the stacked film units forwardly toward the forward wall of the container to support the forwardmost film unit against the forward wall in proper position for exposure to light entering the container through the light-transmitting section, e.g., aperture, in the forward wall. The camera includes means for properly positioning the container relative to the camera lens to insure that a film unit supported against the forward wall of the container is also located with the photosensitive element of the film unit properly located with respect to the camera lens, e.g., in the focal plane thereof.

The biasing means of the present invention, instead of being located within the film container as formerly provided, is located externally of the film container as a component of the camera and is designed to extend into the film container to urge the stacked film units toward the forward wall of the film container. The biasing means may directly urge the film units forwardly or it may exert a biasing force on the battery which in turn urges the film units forwardly. This construction avoids the necessity of incorporating such biasing means within each film container to be discarded therewith and results in substantial saving in cost. These biasing means commonly comprise resilient steel members, for example, and the elimination of such members from millions of film containers sold each year obviously represents a substantial and worthwhile economy.

It is an important feature of the present invention that the biasing means comprise a support member mounted within the camera housing on a component thereof and carrying a pair of electrical contacts designed to engage the terminals of a battery in the film pack. The electrical contacts may be mounted on the support member and thereby be urged together with the stacked film units toward the forward wall of the container while the electrical contacts are urged by the same resilient means into engagement with the terminals of the battery to draw electrical current therefrom for operating the electrically energized components of the camera. Thus the support member serves the two functions of urging the photosensitive elements of the film units into proper position for exposure and providing an electrical connection between the battery within the film container and the electrically energized components of the exposure and processing systems of the camera.

Another significant feature of the invention is that the biasing means may comprise a support member of members designed to independently urge the film units against the forward wall of the film container without also urging the battery forwardly against the film units. The biasing means may comprise separate resilient means such as springs mounted directly on the camera housing for urging electrical contacts supported by the spring members against the terminals of the battery. With the this latter arrangement, it is possible to apply substantially different biasing forces to the film units and to the electrical contacts. This is a decided advantage since the biasing force required to be exerted on the film units may, for example, be substantially less than that required to be exerted on the electrical contacts to make good electrical contact with the battery terminals.

Accordingly it is an object of this invention to provide biasing means within and as a component of photographic apparatus such as a camera for urging film units within a film container toward the forward wall of the container to properly position the film units for exposure.

It is another object of the invention to provide biasing means as described including a support member and electrical contacts mounted thereon for both urging film units into position for exposure and the electrical contacts into engagement with the terminals of a battery located within the film container.

It is a further object of the invention to provide biasing means as described including separate resilient means for urging film units toward the forward wall of a film container and independently urging electrical contacts into engagement with terminals of a battery.

It is still a further object of the invention to provide in photographic apparatus as described for exposing film units arranged in a stack, electrically energized means for exposing and/or processing the film units and biasing means for both urging a film unit forwardly into proper position for exposure and for urging electrical contacts coupled with the electrically energized means forwardly into engagement with terminals of a battery positioned behind the film units to connect the battery with the electrically energized means.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The photographic apparatus of the present invention may be any one of the various well-known types of cameras, particularly a self-developing type of camera such as shown and described in the copending U. S. Pat. application of Edwin H. Land et al., Ser. No. 655,850, filed Jul. 25, 1967, which include either as components or accessories, electrically energized means for exposing and/or processing film units with which the camera is employed.

Figure 1:
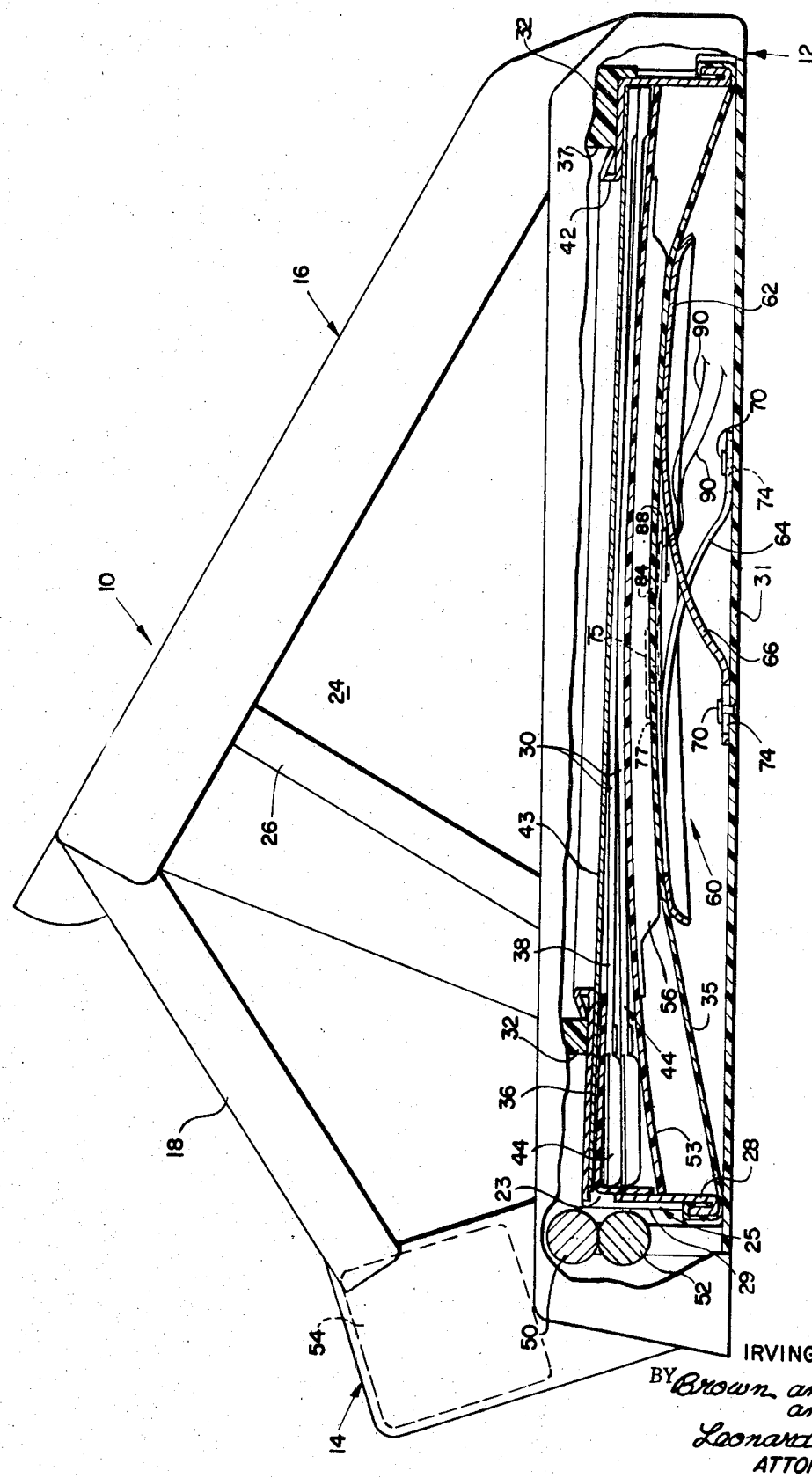
FIG. 1 is a side elevational view, partly in section, of a camera and a film container within.

A camera of the type embodying the present invention is illustrated in FIG. 1 of the drawings and generally indicated by the reference numeral 10. Camera 10 is shown as having a hexahedron configuration including four relatively movable housing sections. These sections include a base or principal body section 12 to which is pivotally coupled a forward section 14 including a lens and shutter assembly, an intermediate section 16 pivotally connected at the opposite end of body section 12; and a connecting section 18 pivotally coupled at its ends to forward section 14 and intermediate section 16. An erecting link 26 is provided for aiding in pivoting the sections of the camera from a folded position into the erect position shown in FIG. 1 and retaining the sections in erect position. The camera may include a conventional exposure system comprising, for example, a lens, an aperture and, preferably, an electrically energized shutter, mounted within forward section 14. The main body section 12 is constructed to provide a storage chamber for holding a film pack or container of film units and locating one of the film units in position for exposure. The optical path between the exposure system in forward section 14, and a film unit positioned for exposure within body section 12 includes a mirror (not shown) mounted within intermediate section 16. The camera includes a collapsible bellows or boot 24 connected to body section 12, forward section 14 and intermediate section 16 to provide an optical path between the exposure system and the film unit. This folded optical path permits smaller, more compact and convenient camera body design, particularly in the folded or collapsed position of the camera sections. For a more detailed description of the camera construction, reference may be had to the aforementioned Land et al. application, and for a description of the bellows or boot, reference may be had to the U.S. Pat. application of Irving Erlichman, Ser. No. 655,859, now Pat. No. 3,479,941 filed Jul. 25, 1967.

A film pack 25 adapted to be employed in the apparatus of the invention and including a plurality of film units 30 is shown in FIG. 1 within the camera 10 in position for exposing the photosensitive elements of the film units. Film pack 25 includes a container 28 (also shown in FIGS. 4 and 5) having a forward wall 36 and dependent end walls 29 and 34 and sidewalls 33. Forward wall 36 includes a light-transmitting section in the form of a rectangular opening 42 the forward wall. End walls 29 and 31 extend rearwardly from the forward wall 36 and an exit slot 23 is provided in end wall 29 for withdrawing film units 30 one at a time from container 28 following exposure thereof. Film container 28 has an opening in the rear thereof which is covered by a closure member 35 secured to the end and sidewalls of the container and which may be formed of an elastomeric material so as to be displaceable with respect to the forward wall 36.

The film units depicted in the drawing are preferably of the so-called "self-developing" type shown and described in U.S. Pat. application of Edwin H. Land, Ser. No. 622,287, and Edwin H. Land et al., Ser. No. 622,286, now abandoned both filed Mar. 10, 1967. Each film unit of this type incorporates all of the materials necessary to produce a positive photographic image, including, for example, a photosensitive sheet cooperatively combined in superposed relation with a transparent, image receiving sheet. Each film unit also includes at one end thereof, a rupturable pod or container of a liquid processing agent adapted to be distributed from the container between and in contact with the two sheets. A plurality of film units 30 are shown arranged in stacked relation at 44. An opaque safety cover 43 is shown in place within container 28 between forward wall 36 and the forwardmost film unit 38 in closing relation to aperture 42 to prevent premature exposure of film units 30. Before exposure of the forwardmost film unit 38, cover 43 is withdrawn through opening 23 by the same means described hereinafter for withdrawing the film units from container 28. For a more detailed description of this cover 43, as well as the other structure included within container 28, reference may be had to the copending U.S. Pat. application of Irving Erlichman et al., Ser. No. 785,157, filed on an even date herewith.

Camera 10 is shown in FIG. 1 as including means for holding the container of film units arranged within the camera in position for exposure of the forwardmost film unit. In the form shown these holding means comprise rear wall 31 which cooperates with other components of the main body section of the camera to provide a storage chamber for holding film container 28. The forward side of this storage chamber includes support means in the form of wall 32 formed with an opening 37 for engaging the forward wall 36 of the film container 28 for locating the forwardmost film unit 38 in position for exposure. Rear wall 31 may be pivotally coupled to the remainder of main body section 12, thus providing a door adapted to be opened to permit loading of a film assemblage into the storage chamber within the camera.

Means are provided within the camera for engaging the forwardmost film unit following exposure thereof and advancing it from the container 28 through exit slot 23 into engagement with processing means shown as a pair of juxtaposed rollers 50 and 52. Rollers 50 and 52 are biased toward one another and are preferably driven by a conventional electrically energized motor 54 through appropriate mechanical transmission not shown. As a film unit is advanced by and between pressure applying rollers 50 and 52, container 44 of processing liquid is ruptured and the liquid contents are spread between the photosensitive and image receiving sheets of the film unit to initiate an image forming process.

Figure 4:
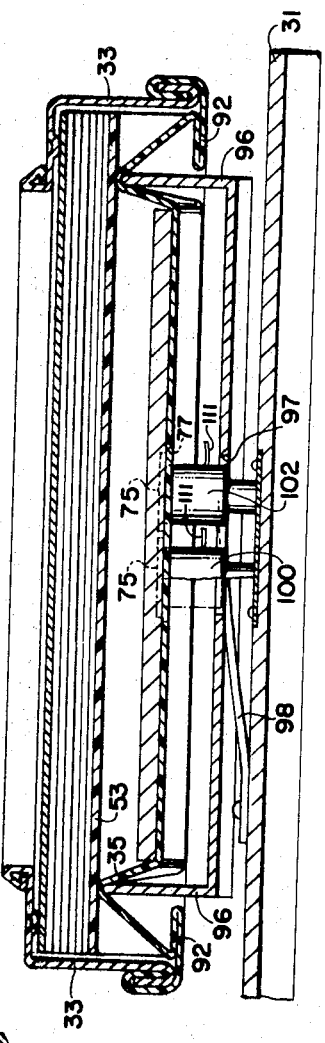
FIG. 4 is a cross-sectional view taken along line 3—3 in FIG. 4.

The film assembly includes means for supplying electrical energy for powering a motor for driving the pressure applying rollers and/or other electrically energized components of the camera, or accessories such as flash devices, operatively associated with the camera. This source of electrical energy is shown as a flat battery 56 included within the film container 28 behind the stacked film units 30 and provided with a pair of terminals 75 on the rear surface thereof as shown in FIG. 4. Elastomeric closure member 35 overlays battery 56 and is formed with an opening 77 providing access to the battery terminals.

Figure 2:
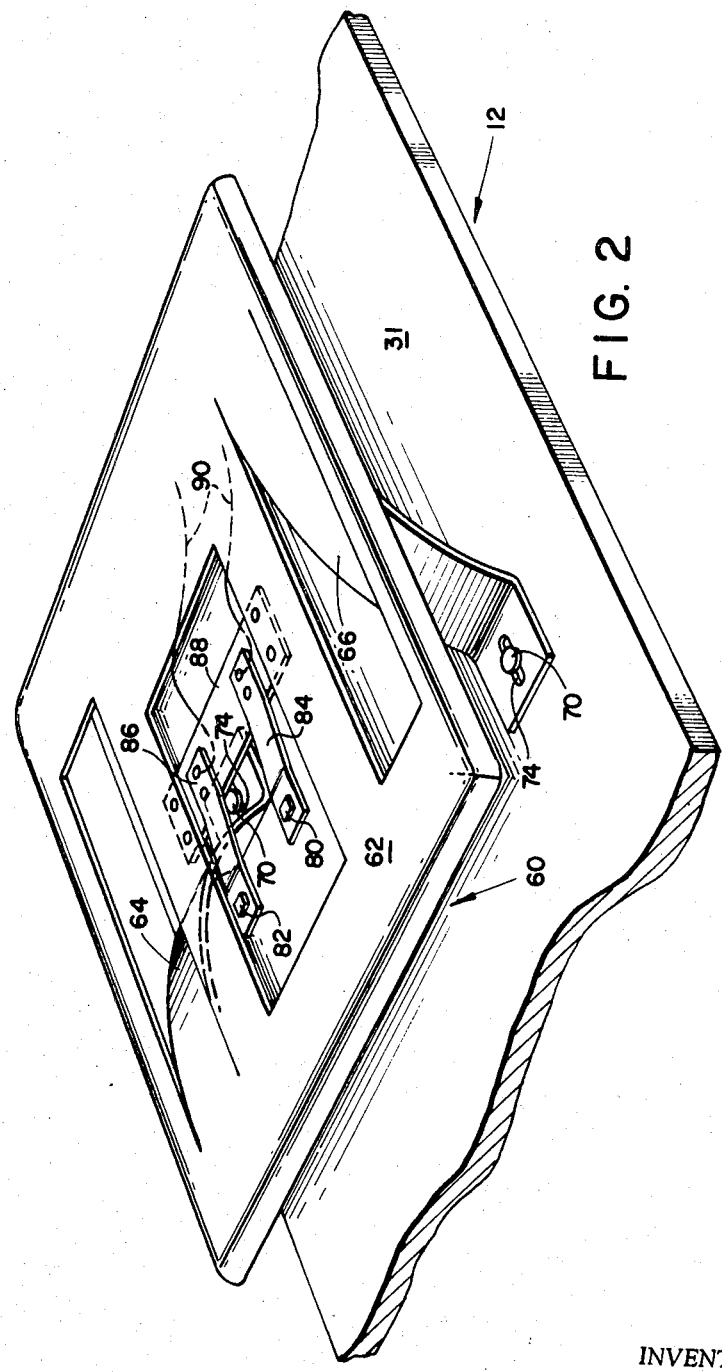
FIG. 2 is an enlarged view in perspective of the pressure plate and electrical contacts mounted on the camera housing.

Camera 10 includes biasing means for urging the film units forwardly within the container to locate the forwardmost film unit in position for exposure and support a pair of electrical contacts in the camera against the terminals of the battery. The form of biasing means shown generally at 60 in FIG. 1, and more clearly in FIG. 2, include a support member in the form of a plate 62 having a pair of legs partially cut out and bent away from the remainder of the plate to form cantilever spring 64 and 66. Springs 64 and 66 are each attached to the rear wall 31 of the camera housing 12 by a rivet 70 extending through a slot 74 in the spring allowing for movement as the plate 62 moves toward or away from the rear wall. As shown in FIG. 1, the biasing means 60 engages closure member 35, displacing it and battery 56 forwardly and, in turn, urging the film units forwardly toward the forward wall 36 of the film container, thereby supporting the forwardmost film unit 38 against the forward wall in position for exposure. A backing member 53, to which battery 56 may be attached, is provided between the battery and the film units to distribute the force applied to the battery 56 over film units 30. The pressure member 62 has rounded and rearwardly turned edges to eliminate any sharp edges or corners which may cut through closure member 35. Biasing means 60 also include electrical contacts 80 and 82 mounted on cantilever springs 84 and 86 for urging the contacts into engagement with the battery terminals 75. Springs 84 and 86 are mounted on a insulating plate 88 secured to the pressure plate 62 (which may be formed of metal); and a pair of wires 90 are connected to contacts 80 and 82 for transmitting electrical current from the battery to the electrically energized components of the camera.

Figure 3:
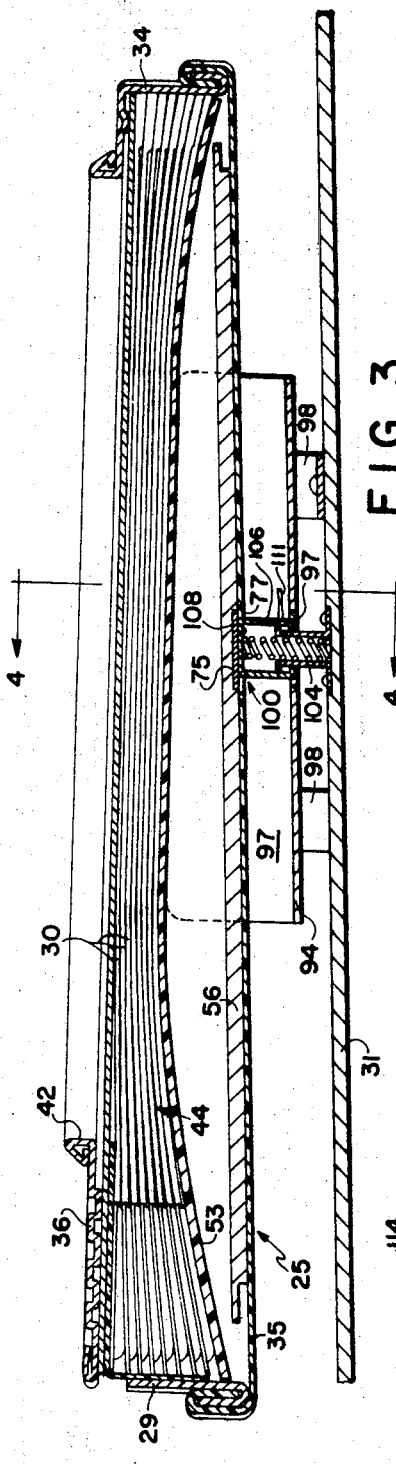
FIG. 3 is a sectional view of one embodiment of the invention showing the film units and battery in the film container and biasing means cooperating therewith.

Another embodiment of the biasing means of the invention is shown in FIGS. 3 and 4, adapted to be employed with a film pack 25 differing from the film pack previously described in that the battery 56 is mounted on rear closure 35 which is constructed to restrain the battery against forward movement. Rear closure 35 is formed of a flexible but nonelastic sheet material which is secured to the end walls 29 and 34 of container 28 so as to prevent movement of the battery 56 relative to the container. Rear closure 35 is attached to sidewalls 33 of the container and includes portions 92 located adjacent the sidewalls between the latter and the battery, which are pleated to allow them to be displaced forwardly into the container. The closure 35 overlays battery 56 and is formed with an opening 77 providing access to the battery terminals. The biasing means in this embodiment for urging the forwardmost film unit 38 forwardly toward the forward wall 36 in position for exposure include a support member in the form of a plate 94 mounted on rear wall 31 of the camera housing and including lateral edge portion or flanges 96. Flanges 96 are adapted to extend forwardly into the container between sidewalls 33 and the battery for biasing the backing member 53 and film units forwardly without also biasing the battery forwardly. The plate 94 includes an opening 97 providing access to the battery terminals. According to this embodiment of the biasing means, separate spring means are provided for forwardly biasing the film units and electrical contacts independently of one another. The spring means for urging plate 94 forwardly comprise two sections of the plate partially cut out and bent away from the remainder of plate 94 to form cantilever springs 98 attached to wall 31. As the plate 94 is urged forwardly, flanges 96 urge the backing member 53 and the film units 30 forwardly to position the forwardmost film unit in position for exposure against the forward wall 36.

A pair of electrical contacts 100 and 102 are connected to the rear wall 31 of the camera housing, each contact comprising a portion 104 connected directly to the rear wall 31 of the camera housing and a portion 106 slidable thereon having a top surface 108 adapted to engage a battery terminal. The spring means for forwardly biasing the electrical contacts forwardly comprise a coil spring 110 inside each of the contacts urging the top portion forwardly and pushing the top surface 108 against each battery terminal 75, insuring good electrical contact therewith. The opening 97 in the plate 94 and the opening 77 in the rear closure 35 provide access for the electrical contacts to the battery terminals. The contacts 100 and 102 are made of electrically conductive material and a pair of wires 111 are connected to the contacts for transmitting electrical current from the battery to the electrically energized components of the camera.

Figure 5:
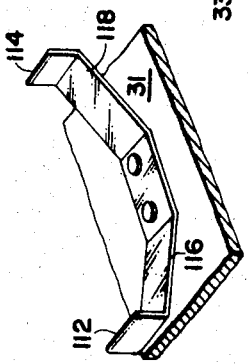
FIG. 5 is a perspective view of one form of means to support the film units within the film container for exposure.

Another embodiment of the support member is shown in FIG. 5 as comprising a pair of fingers 112 and 114 adapted to extend into the back of the film container in a similar manner to the lateral edge portions, as shown in FIG. 3, to urge the film units forwardly against the front wall of a film container. The biasing means in this case comprise separate leaf springs 116 and 118 attached to rear wall 31 to urge fingers 112 and 114 in the direction of the forward wall of the film container.

It can be seen from the foregoing that by placing the spring-biased support member on the camera housing, such members may be eliminated from each and every film pack, resulting in great cost advantages. Also, the mounting of the electrical contacts for engaging the battery terminals directly on the pressure member in one of the embodiments results in a simpler and easier to manufacture photographic camera.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. The combination comprising:
 a photographic film container having a forward wall including a light transmitting section through which a film unit can be exposed;
 a plurality of photographic film units, each including at least one photosensitive element, stacked within said container;
 a battery including terminals positioned within said film container behind said film units; and
 biasing means located behind said battery and including electrical contacts and means for urging said film units toward said forward wall to support the forwardmost film unit against said forward wall in position for exposure urging said contacts into engagement with said battery terminals.

2. The combination defined in claim 1 wherein said battery terminals are mounted behind said battery and said biasing means include a support member, and resilient means for urging said support member and said contacts forwardly to support the forwardmost film unit against said forward wall and urge said electrical contacts into engagement with said battery terminals.

3. The combination defined in claim 2 wherein said electrical contacts are mounted on said support member.

4. The combination defined in claim 3 wherein said electrical contacts are mounted on resilient elements mounted on said support member and biased toward said battery.

5. The combination defined in claim 2 wherein said biasing means include first resilient means for urging said support member and said film units toward said forward wall and second resilient means operative independently of said first resilient means for urging said contacts into engagement with said terminals.

6. The combination defined in claim 5 including a backing member located between said battery and said film units, wherein said support member is constructed to exert pressure against only said backing member.

7. The combination defined in claim 5 including means for restraining said battery against movement relative to said film container.

8. The combination defined in claim 7 wherein said container includes sidewalls extending rearwardly from said forward wall and said support member is in the form of a plate including lateral spaced portions extending form forwardly into said container adjacent said sidewalls between the latter and said battery for exerting pressure against said support member.

9. The combination defined in claim 8 wherein said container includes end walls extending rearwardly from said forward wall and said battery is mounted on a closure member secured to said end walls, said closure member comprising said means for restraining said battery against movement relative to said container.

10. Photographic apparatus for exposing a succession of photographic film units arranged in a stack within said apparatus, said apparatus comprising, in combination:
 means for holding a plurality of film units arranged in a stack;
 support means for locating the forwardmost film unit of said stack in position for exposure;
 electrically energized means for exposing or processing said film units stacked within said apparatus;
 electrical contacts connected to said electrically energized means for engaging the terminals of a battery located behind said stack of film units to transmit electrical current from said battery to said electrically energized means; and
 biasing means for urging said film units forwardly toward said support means to locate said forwardmost film unit in position for exposure and urge said electrical contacts forwardly into engagement with said battery terminals.

11 Photographic apparatus as defined in claim 10 wherein said biasing means include a support member and resilient means for urging said support member and said electrical contacts forwardly toward said support means.

12. Photographic apparatus as defined in claim 11 wherein said electrical contacts are mounted on said support member.

13. Photographic apparatus as defined in claim 12 wherein said electrical contacts are mounted on resilient elements mounted on said support member and biased forwardly toward said support means.

14. Photographic apparatus as defined in claim 11 wherein the first-mentioned means is adapted to hold a container containing said stack of film units and said battery, and said support member includes lateral sections adapted to extend forwardly into said container adjacent opposite sides of said battery for urging said film units forwardly toward said support means.

15. Photographic apparatus as defined in claim 11 wherein said biasing means include first resilient means for urging said support member and said film units toward said support means to locate said r forwardmost film unit in position for exposure and second resilient means operative independently of said first resilient means for urging said electrical contacts into engagement with said battery terminals.

16. Photographic apparatus as defined in claim 15 wherein said support member is constructed and arranged to urge said film units forwardly toward said support means without urging said battery forwardly.

17. Photographic apparatus as defined in claim 16 wherein said support member includes lateral space sections adapted to extend forwardly adjacent opposite sides of said battery into engagement with a backing element located behind said stack of film units between the latter and said battery.

18. Photographic apparatus as defined in claim 17 wherein said first-mentioned means are adapted for holding a container including sidewalls and containing said stack of film units, said backing element, and said battery located between said sidewalls, and said lateral spaced sections of said support member are adapted to project into said container between said sidewalls and said battery.

UNITED STATES PATENT OFFICE
CERTIFICATE OF CORRECTION

Patent No. 3,561,339        Dated February 9, 1971

Inventor(s) IRVING ERLICHMAN

It is certified that error appears in the above-identified patent and that said Letters Patent are hereby corrected as shown below:

IN THE SPECIFICATION:

Column 1, line 10 (application, page 1, line 10) after "through" insert --which--.

Column 2, line 2 (application, page 3, line 16) "of" should be --or--.

Column 2, line 9 (application, page 3, line 23) delete "the".

Column 4, line 5 (application, page 8, line 24) insert --a-- after "of".

Column 4, line 44 (application, page 10, line 3) "spring" should be --springs--.

Column 4, line 61 (application, page 10, line 22) "a" should be --an--.

IN THE CLAIMS:

Column 6, line 1 (application, claim 1, line 14) after "exposure" insert --and--.

Column 6, line 31 (application, claim 8, line 4) delete "form".

Column 7, line 6 (application, claim 15, line 4) delete "r".

Signed and sealed this 17th day of August 1971.

(SEAL)
Attest:

EDWARD M. FLETCHER, JR.
Attesting Officer

WILLIAM E. SCHUYLER, JR.
Commissioner of Patents